(12) United States Patent
Sutton et al.

(10) Patent No.: US 7,237,243 B2
(45) Date of Patent: Jun. 26, 2007

(54) MULTIPLE DEVICE MANAGEMENT METHOD AND SYSTEM

(75) Inventors: Paul C. Sutton, Seattle, WA (US); Curt A. Steeb, Redmond, WA (US); Gang Wang, Issaquah, WA (US); Martin L. Holladay, Bremerton, WA (US); Zeyong Xu, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 619 days.

(21) Appl. No.: 10/075,633

(22) Filed: Feb. 14, 2002

(65) Prior Publication Data

US 2003/0037177 A1 Feb. 20, 2003

Related U.S. Application Data

(60) Provisional application No. 60/297,473, filed on Jun. 11, 2001.

(51) Int. Cl.
*G06F 3/00* (2006.01)
(52) U.S. Cl. ....................................... 719/310
(58) Field of Classification Search ................ 719/310; 718/105
See application file for complete search history.

(56) References Cited

U.S. PATENT DOCUMENTS

| | | | | |
|---|---|---|---|---|
| 5,978,381 A | * | 11/1999 | Perlman et al. | 370/432 |
| 5,987,504 A | * | 11/1999 | Toga | 709/206 |
| 6,125,394 A | * | 9/2000 | Rabinovich | 709/226 |
| 6,220,768 B1 | | 4/2001 | Barroux | |
| 6,324,580 B1 | * | 11/2001 | Jindal et al. | 709/228 |
| 6,701,323 B2 | * | 3/2004 | Sashino et al. | 707/103 R |
| 6,728,748 B1 | * | 4/2004 | Mangipudi et al. | 718/105 |
| 6,789,105 B2 | * | 9/2004 | Ludwig et al. | 709/204 |
| 6,839,723 B2 | * | 1/2005 | Sugimoto et al. | 707/203 |
| 2002/0116437 A1 | * | 8/2002 | Kambara et al. | 709/102 |

FOREIGN PATENT DOCUMENTS

| | | |
|---|---|---|
| WO | WO 98/09402 | 3/1998 |
| WO | WO 99/18695 | 4/1999 |

OTHER PUBLICATIONS

C. Mohan, Exotica: A Project on Advanced Transaction Management and Workflow Systems, Aug. 1995.*
Anonymous, International Search Report in Corresponding EP Application No. EP 02 01 2442.

* cited by examiner

*Primary Examiner*—Wei Zhen
*Assistant Examiner*—LeChi Truong
(74) *Attorney, Agent, or Firm*—Workman Nydegger

(57) ABSTRACT

A multiple device management method and system that executes commands on one controller computer, such as in a data center, to initiate operations on controlled computers containing agent software. An operation may comprise the execution of script, execution of a binary program, or other operations. The mechanism works with sets of computers as if they were a single computer, whereby, for example, management of computing devices is greatly simplified, and the cost of managing computing devices in a data center is significantly reduced. The controller communicates with the nodes using a messaging format, and provides a schema to represent the available nodes in the data center, their organization into sets, and the results of ongoing and completed operations. The schema may also be used to manage jobs to perform on nodes and sets of nodes.

27 Claims, 15 Drawing Sheets

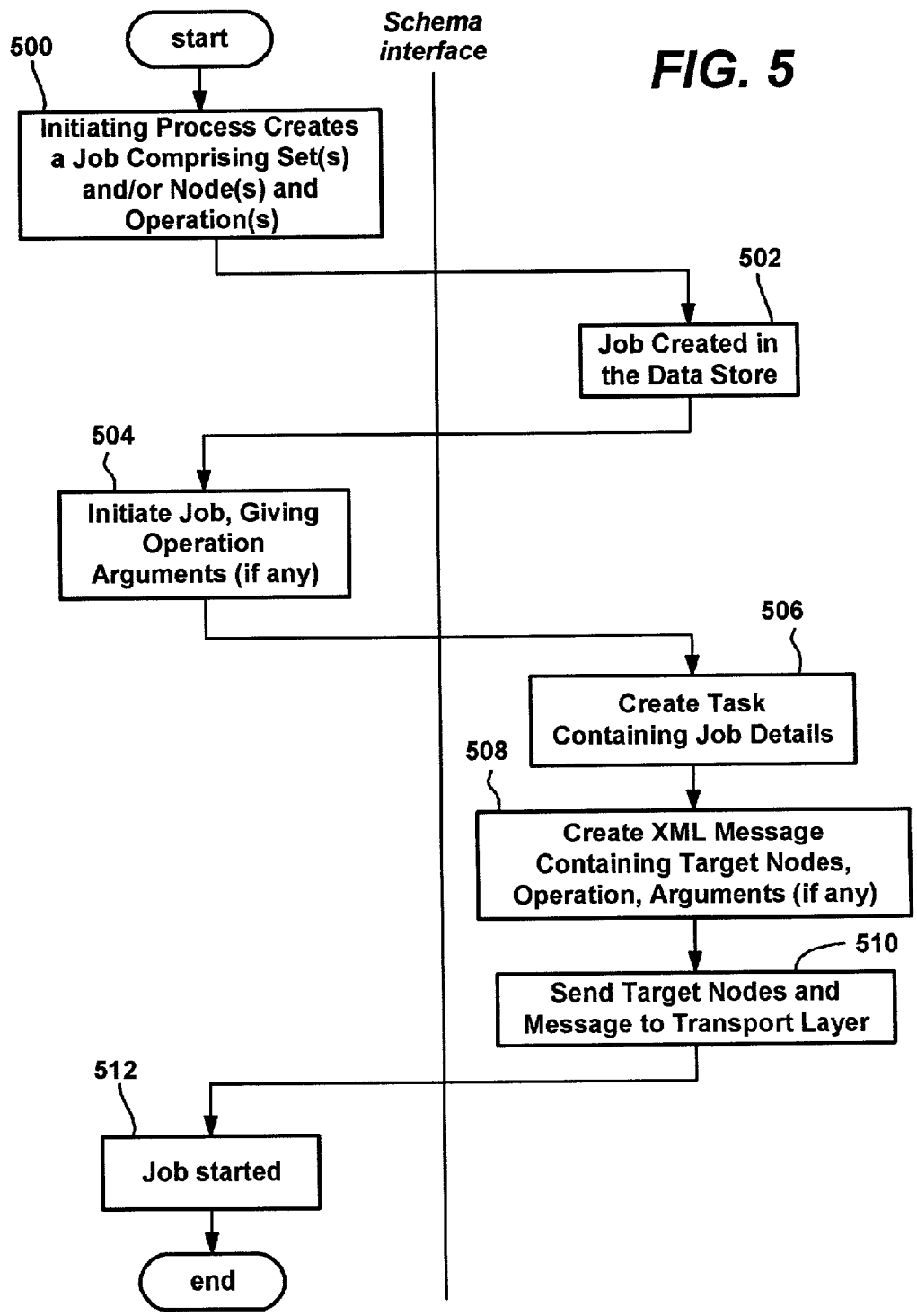

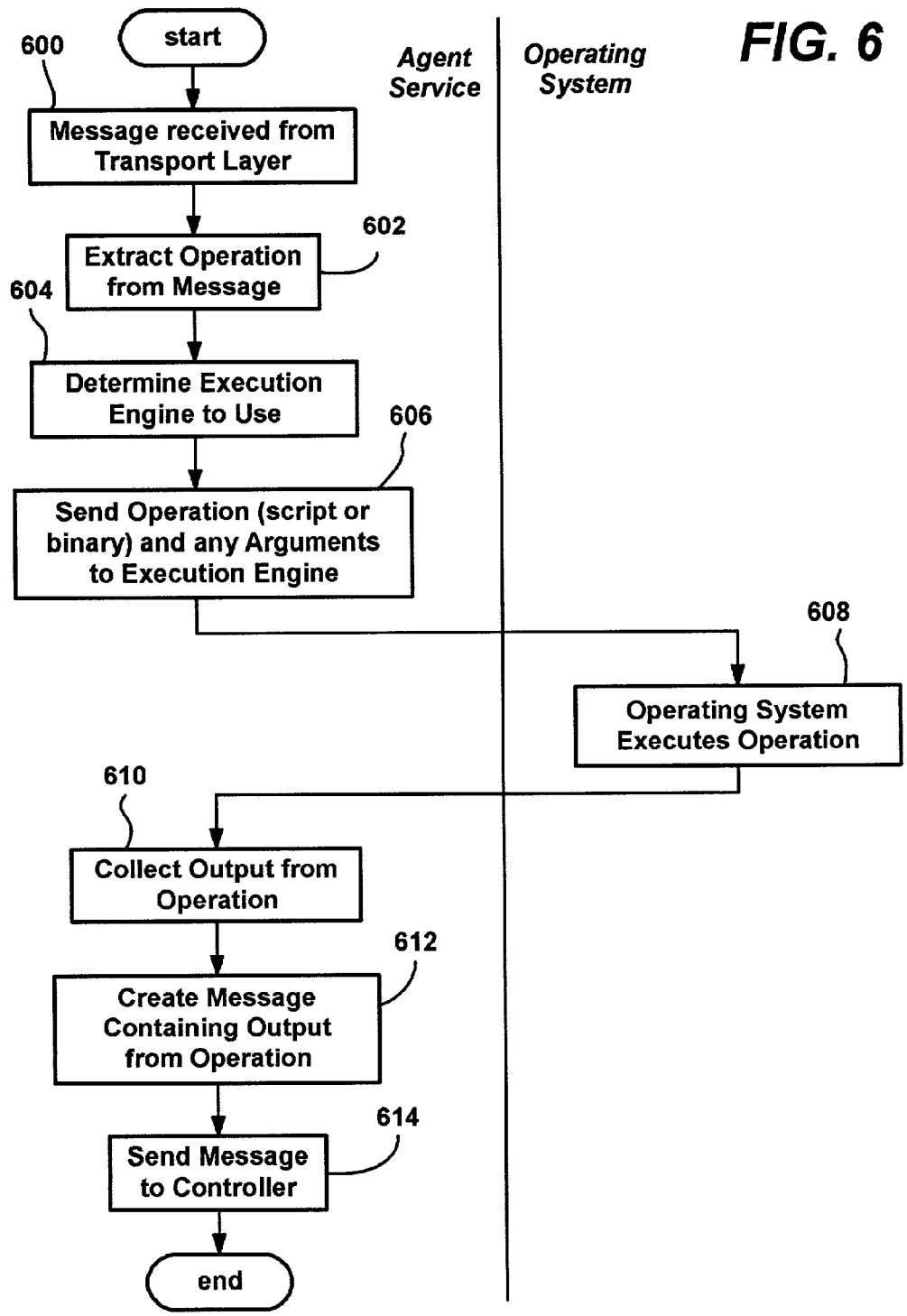

MULTIPLE DEVICE MANAGEMENT METHOD AND SYSTEM

CROSS REFERENCE TO RELATED APPLICATION

This application claims priority to U.S. Provisional Patent application Ser. No. 60/297,473 Filed Jun. 11, 2001.

BACKGROUND OF THE INVENTION

Data centers provide computing resources for many types of organizations, including enterprises and various Internet-related service providers, such as storage service providers, hosting service providers and application service providers. A typical data center contains anywhere from hundreds to many thousands of computers, performing a variety of roles for a variety of purposes.

Managing a large number of computers can be costly, time consuming, and error-prone. For example, many service providers find that running a data center is a labor-intensive business, as many routine processes are performed manually. By way of example, bringing a new server online for a new customer consists of having an engineer print-out the new customer's order, install an operating system, install any applications, configure the operating system and applications, and move the server machine into the data center to attach to the network and to a power source. Bringing a new server online is thus a lengthy and expensive process, and prone to error.

Similar manual processes are used when an existing server configuration is to be "reprovisioned" for a new customer via software. In fact, the cost of reprovisioning is so great that some service providers find it cheaper to not do so. Part of the expense it that such unused systems can normally only be located via an expensive manual audit of the data center. Similarly, rather than redeploying a computer that is no longer needed, it may be cheaper leave the server computer in the data center (running and consuming power), or completely disassemble the computer, rather than attempt redeployment.

In sum, running a data center requires making a number of compromises that are necessary for practical purposes but are not very desirable. For example, instead of redeploying computers, it may be cheaper not to, but this means that data centers have computer systems up and running (using power, air conditioning and network ports) even when they are no longer required for service.

As another example, although expensive, manually configuring various servers is still the way in which data centers operate. However, reducing such costs through automation is a significant undertaking that has heretofore not been very successful, as among other difficulties, such an attempt requires integration with multiple external products.

SUMMARY OF THE INVENTION

Briefly, the present invention provides a multiple device management method and system, that among other things, provides a mechanism to execute a single command on one controller computer to initiate an action (operation) on one or more other controlled computers referred to as nodes. An operation may comprise the execution of a scripted set of commands, execution of a binary program, or a number of other types of operations. The mechanism works with sets of computers as if they were a single computer, whereby, for example, management of computing devices is greatly simplified, and the cost of managing computing devices in a data center is significantly reduced.

In one implementation, the present invention provides an architecture comprising a controller (e.g., a process or the like) on one computer that manages multiple other computers, each of which contains agent software allowing it to be managed by the controller. In general, the controller provides a central representation of the multiple nodes managed thereby, from which actions can be initiated against the nodes, which may be selected individually or by sets to which the nodes may be assigned. The controller communicates with the nodes using a messaging format, such as one derived from XML (eXtensible Markup Language), using a replaceable underlying transport layer for network communication.

The controller provides a defined way to represent the available nodes in the data center, their organization into sets, and the results of ongoing and completed operations. For example, a schema is used to persist the representation of the available nodes, and sets of nodes (e.g., as grouped together by an administrator typically according to some criterion, such as administrative convenience, operational purposes or other criteria). The schema may also be used to store a record of the results of each action on a storage device accessible to the controller, along with pending and performed operations, and jobs.

Other advantages will become apparent from the following detailed description when taken in conjunction with the drawings, in which:

BRIEF DESCRIPTION OF THE DRAWINGS

FIG. 5 is a flow diagram describing general logic for performing an operation on one or more selected nodes in accordance with an aspect of the present invention;

FIG. 6 is a flow diagram describing general logic for performing requested actions on a node in accordance with an aspect of the present invention.

DETAILED DESCRIPTION OF THE PREFERRED EMBODIMENT

Exemplary Operating Environment

Figure 1:
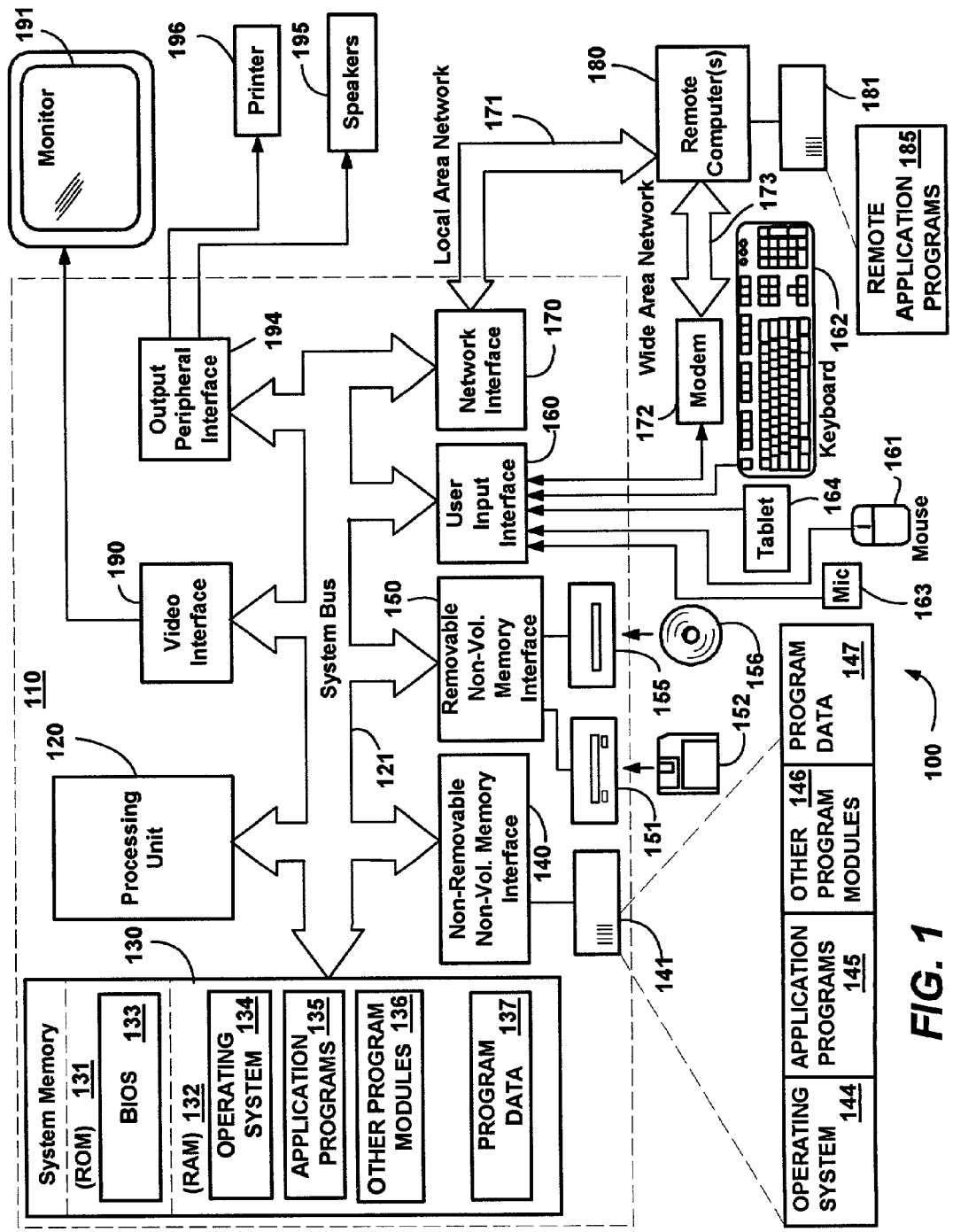
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, routers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention is generally intended to be practiced in distributed computing environments where tasks are performed by remote processing devices that are linked through a communications network. In a distributed computing environment, program modules may be located in local and/or remote computer storage media including memory storage devices.

Figure 2:
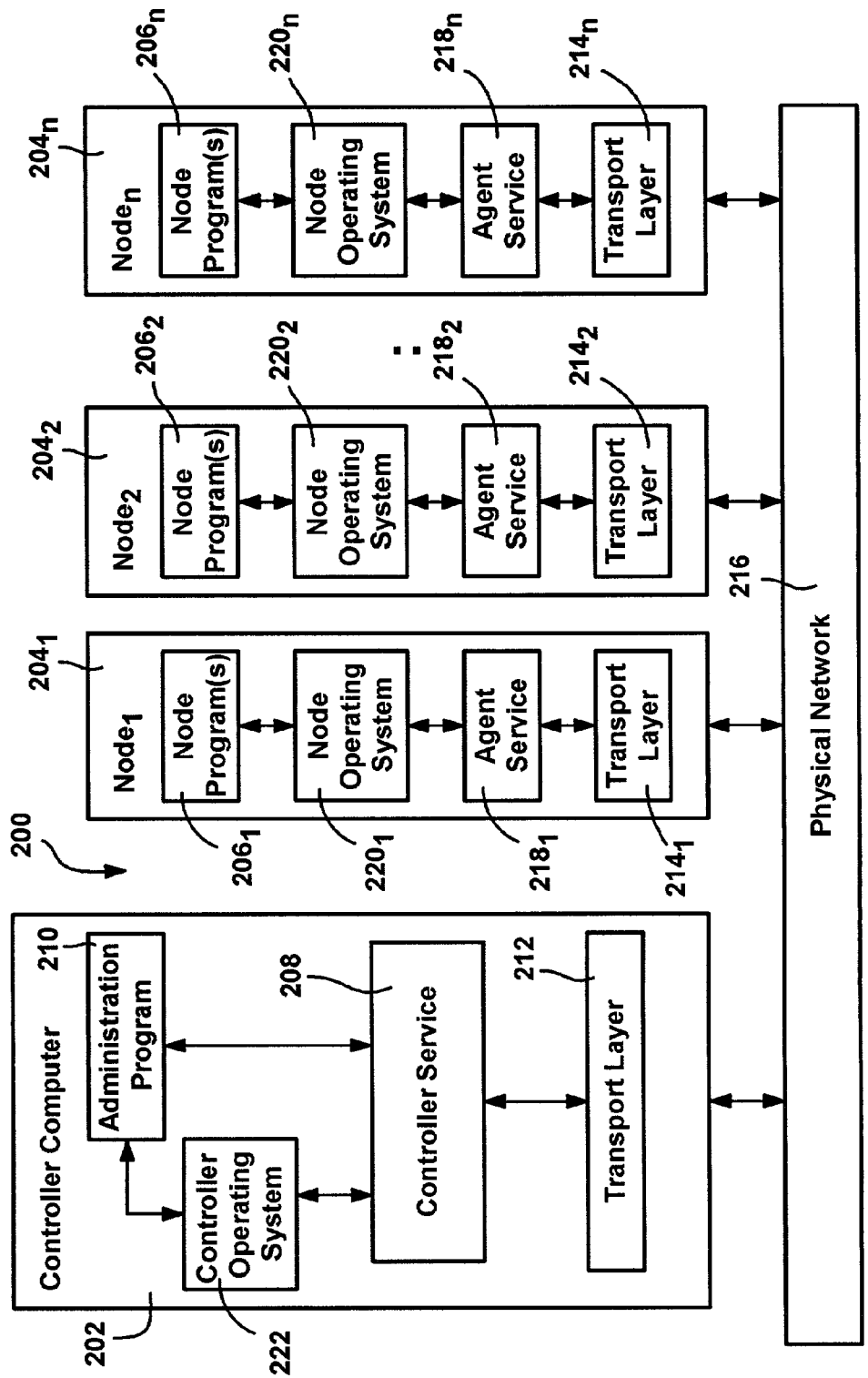
FIG. 2 is a block diagram representing a controller computer connected to a network for managing a plurality of nodes in accordance with an aspect of the present invention.

With reference to FIG. 1, an exemplary system for implementing the invention includes a general purpose computing device in the form of a computer 110, which may act as a controller computer 210 of FIG. 2 for controlling nodes. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

Figure 3:
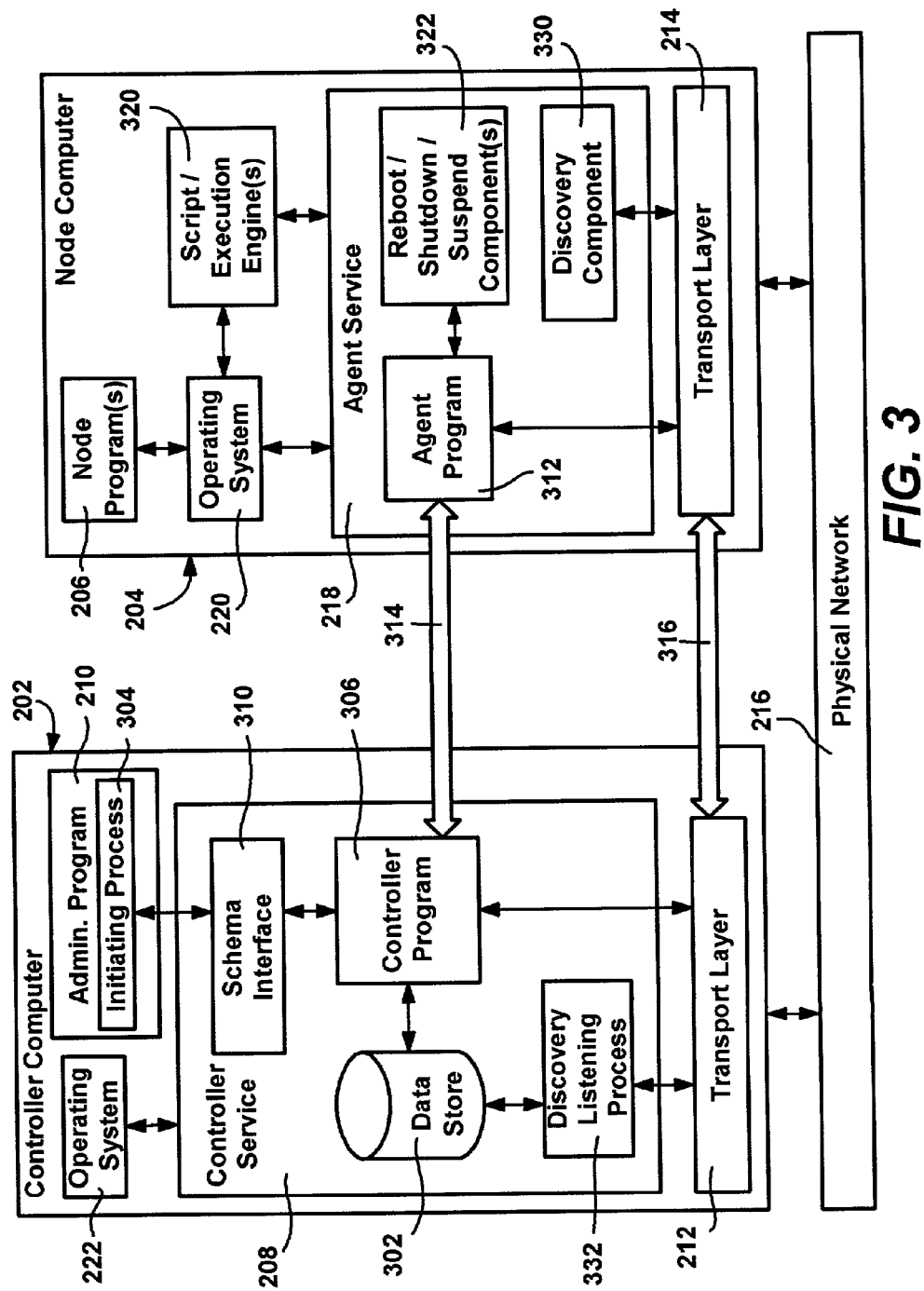
FIG. 3 is a block diagram representing various exemplary components in the controller computer and in one of the nodes managed thereby in accordance with an aspect of the present invention.
Figure 4A:
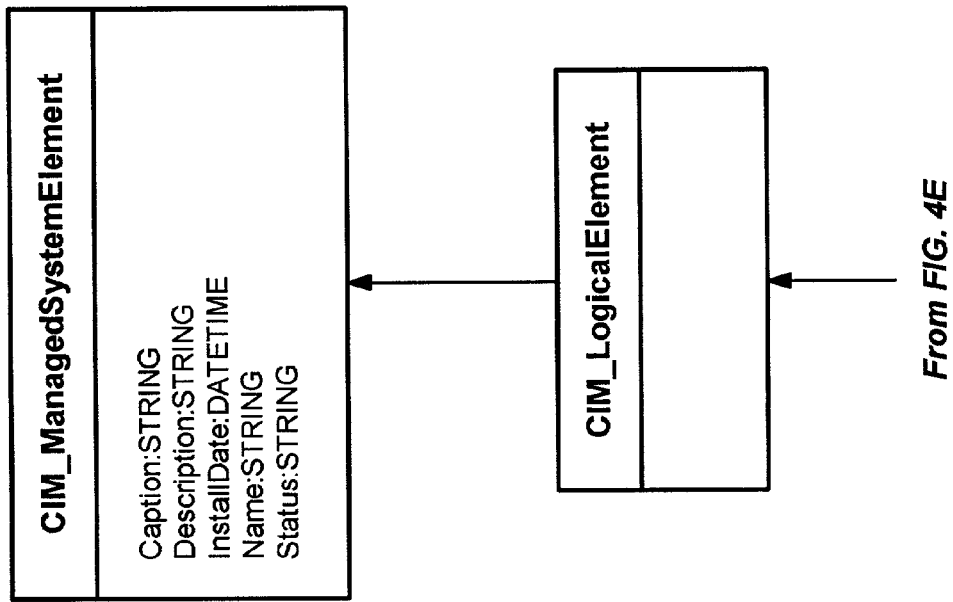
FIGS. 4A-4I represent a suitable defined schema for persisting the representation of available nodes, sets, operations and/or jobs and so forth, in accordance with an aspect of the present invention.
Figure 4B:
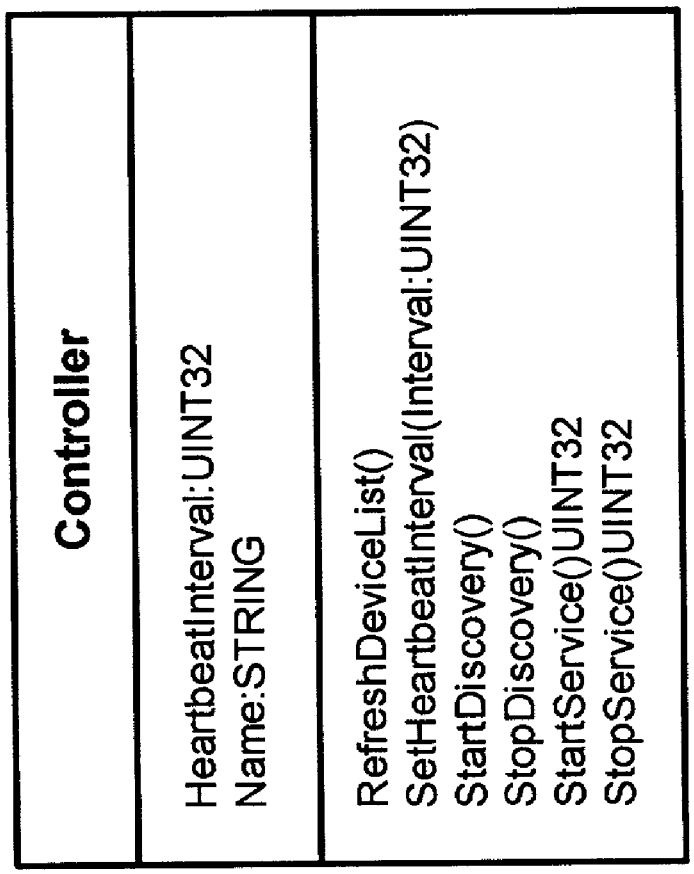
Figure 4C:
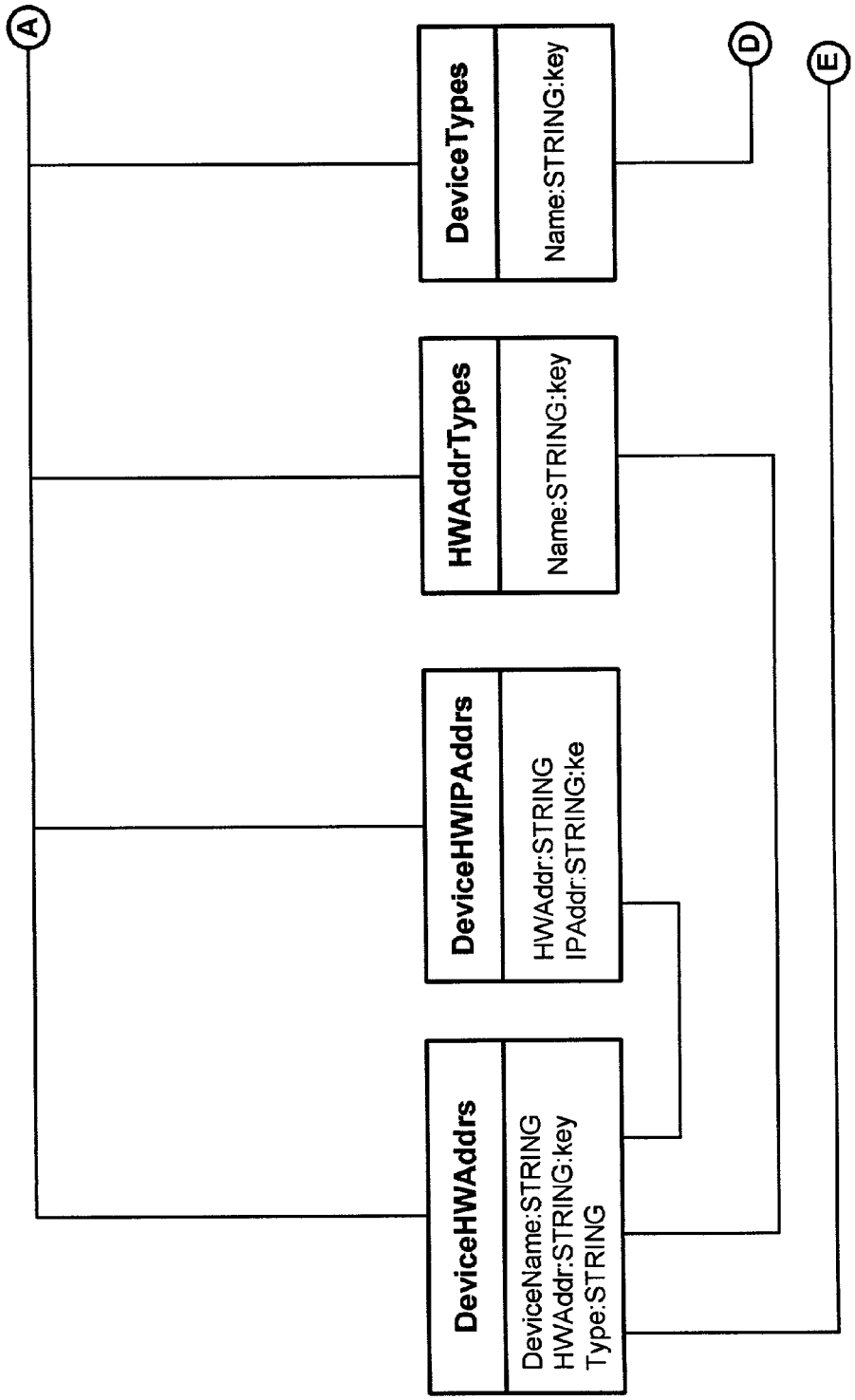
Figure 4D:
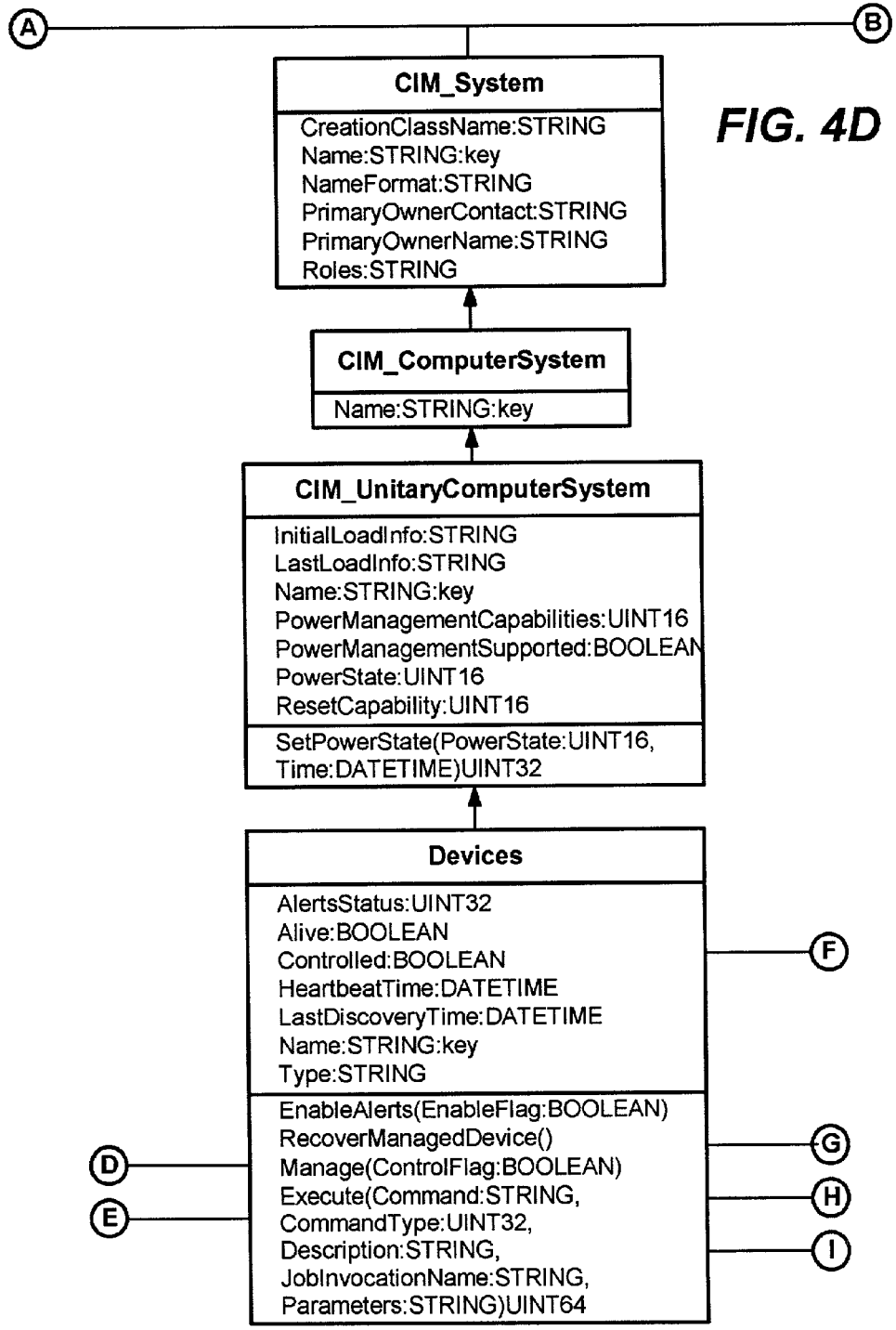
Figure 4E:
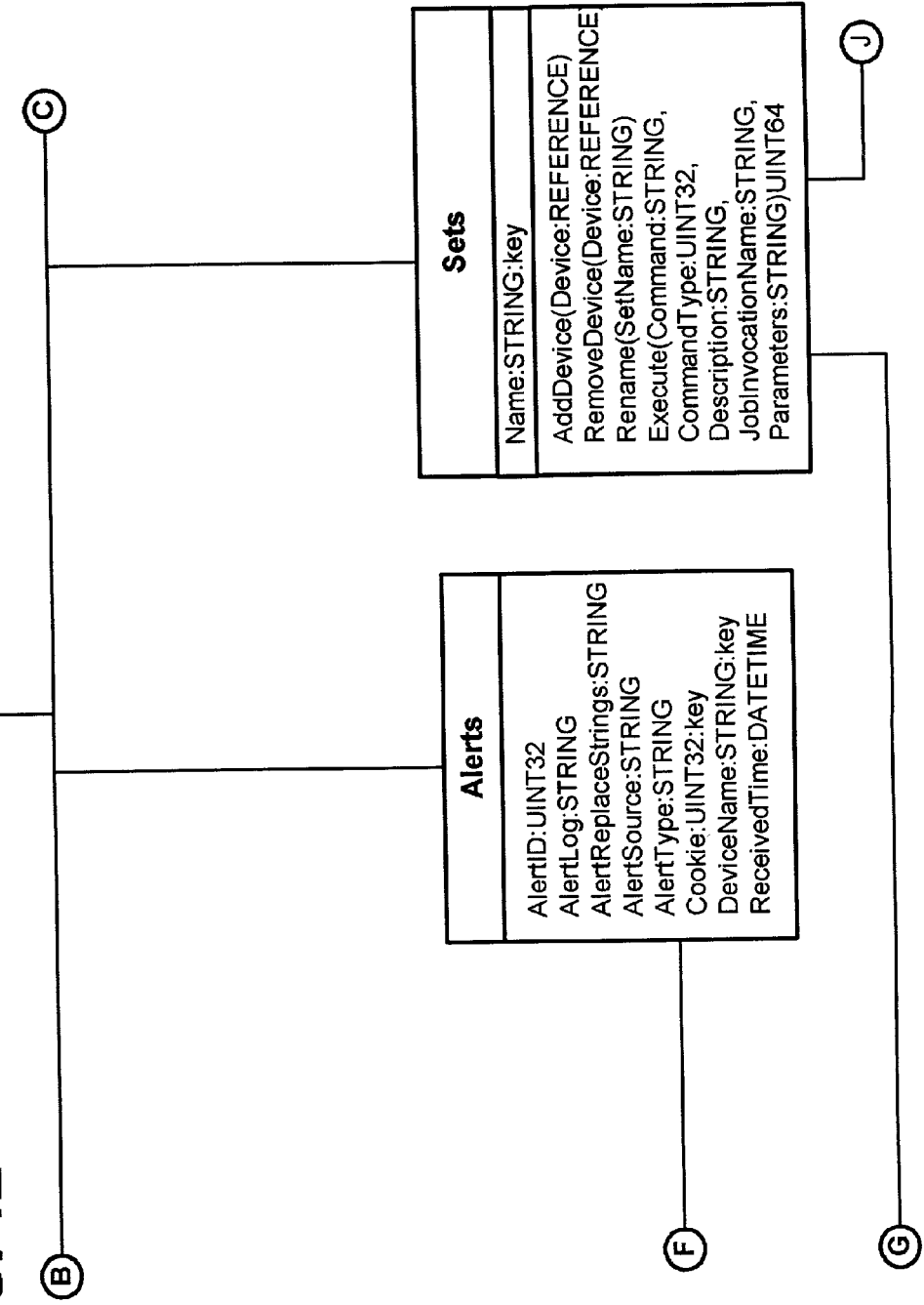
Figure 4F:
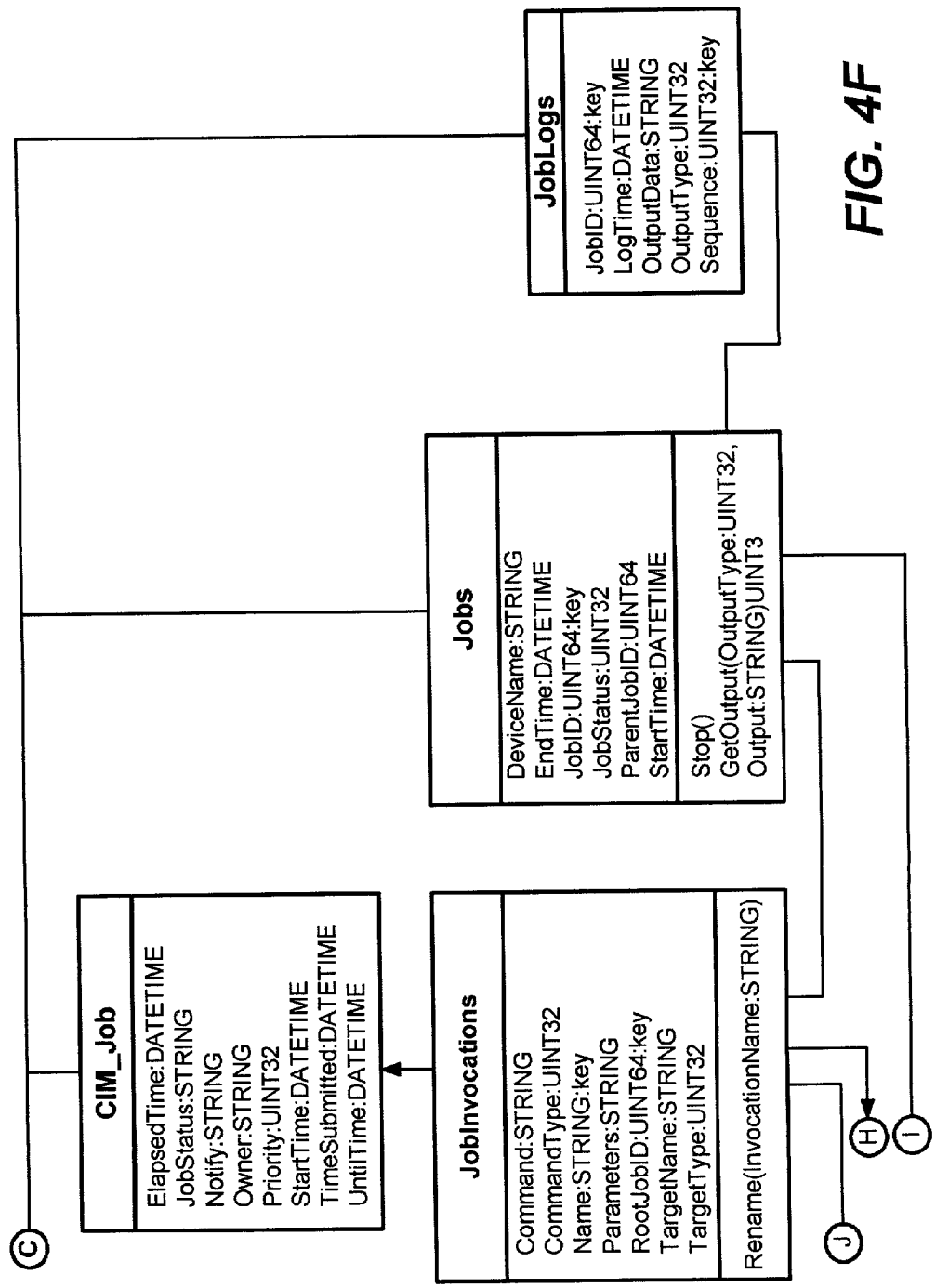
Figure 4G:
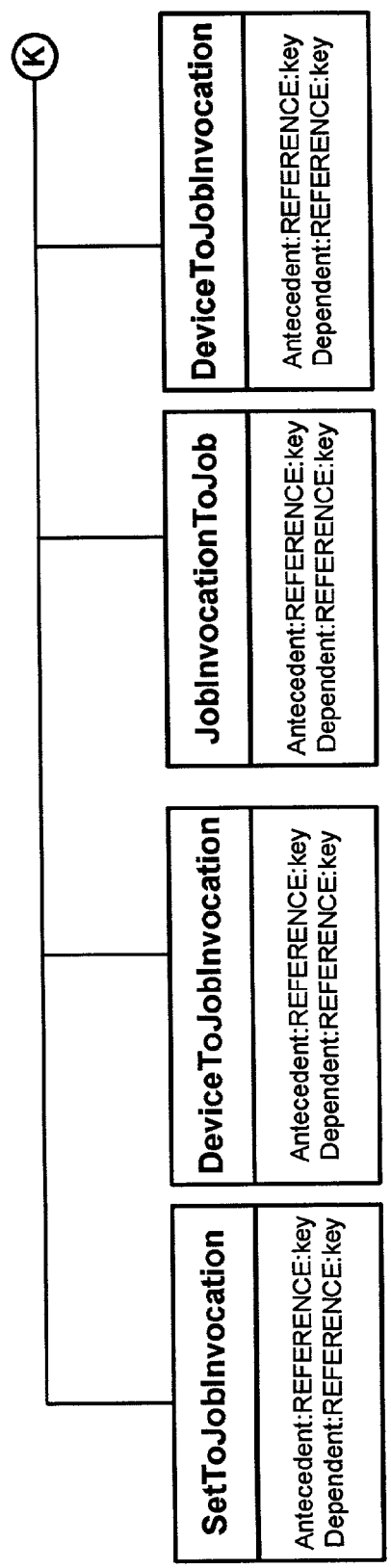
Figure 4H:
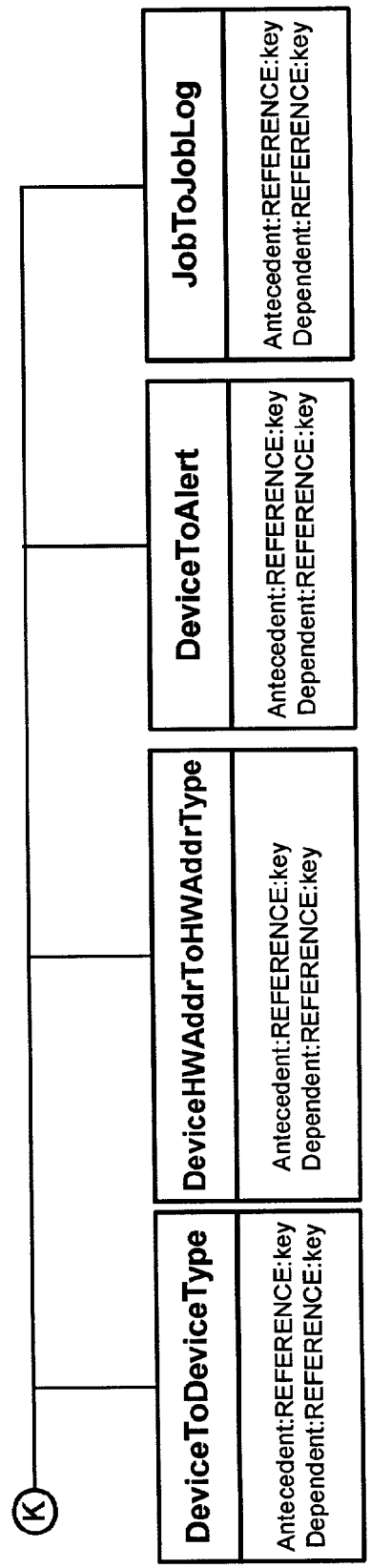
Figure 4I:
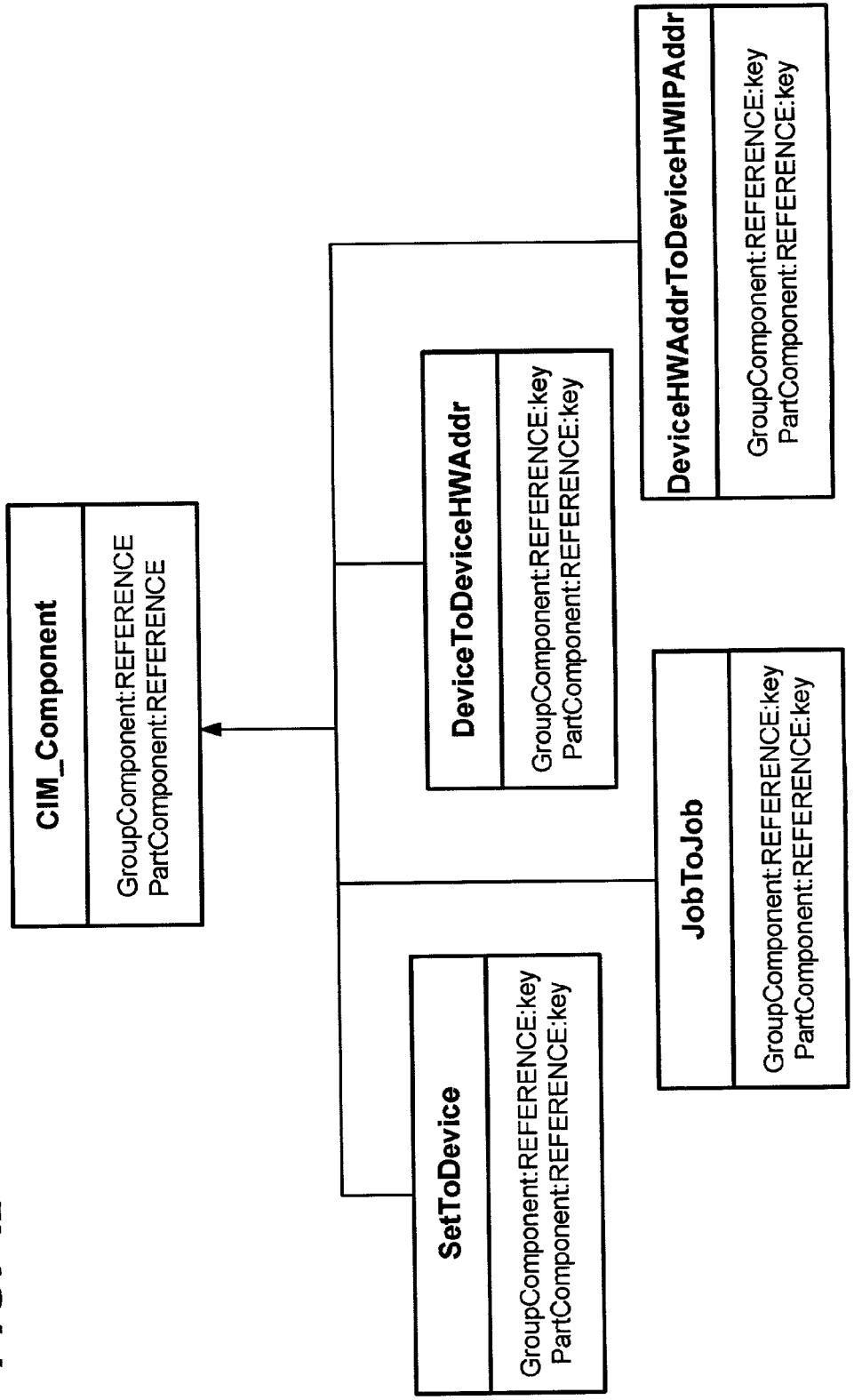

The computer 110 generally operates in a networked environment to control a number of remote server computers 180, alternatively referred to as a node 204 or nodes $204_1$-$204_n$ (FIGS. 2 and 3). Typically, such nodes comprise some or all of the components of the computer 110 as previously described. Nodes may not include user interface mechanisms such as a keyboard, mouse, display, and so forth. Such nodes can run a variety of programs which typically provide services for other computers within the networked environment or to users. Examples of such programs include programs for serving web pages or managing databases. By way of example, and not limitation, FIG. 1 illustrates remote application programs 185 as residing on memory device 181. It will be appreciated that the network connections shown are exemplary and other means of establishing a communications link between the computers may be used.

Multiple Device Management

FIG. 2 comprises a block diagram generally representing an architecture 200 including a controller computer 202 (which may correspond to the computer system 110 of FIG. 1) and a plurality of managed computing devices referred to as nodes $204_1$-$204_n$, (which may correspond to the remote computers 180 of FIG. 1). Note however, that while aspects of the present invention are suitable for use in data centers, such aspects are applicable in any environment where one or more tasks need to be performed on one or more computers. For example, a user having multiple computers and services (such as PDAs, mobile computers, desk top systems, home media center systems, and so on), may use the present invention to perform operations across such multiple devices. Thus, although generally described in a data center environment, the present invention should not be limited to any particular configuration or configurations, but rather contemplates usage with virtually any configuration of computing device such as those set forth above, as well as personal computers, servers, routers and various storage devices.

A typical data center comprises many different computers. To make managing the data center easier, an administrator or the like designates one of the computers as the controller computer 202, (or controller 202). Among other things, in keeping with one aspect of the present invention, the controller computer 202 maintains a master record of computers in the data center, how they are arranged, and what operations can be performed on them. The controller may store this data in a locally attached data store (e.g., as generally represented in FIG. 3), or on a remote data store. The nodes $204_1$-$204_n$ comprise computers in the data center that are capable of being managed by the controller 202. Nodes include node programs $206_1$-$206_n$ or the like that perform the actual work of the data center, such as serving web pages or managing databases.

In accordance with one aspect of the present invention, in order to work with hundreds or thousands of computers in a data center, the administrator applies a logical organization to the computers, that is, the administrator groups the various nodes $204_1$-$204_n$ into sets representing the nodes as logical structures instead of a flat list of all the nodes in the data center. There may be multiple such structures (sets) of computers for a single data center, e.g., grouped by customer or by function, and a node may belong to more than one set. The set information is stored by a controller service 208 or the like in a data store 302 (FIG. 3) maintained by the controller by placing the computers into named sets, e.g., in Unicode characters. Via sets, the administrator can work with logically organized groups of computers as if they were a single computer. Note that it is also feasible to group controllers together if multiple controllers are present in a data center.

To establish and maintain sets, an administration program 210 or the like comprising one or more applications, processes, threads, objects, and/or other software components enables an administrator to interact with the controller service 208, such as via one or more user interfaces. The administration program 210 allows an administrator to create a set, add a node to a set, remove a node from a set, delete a set, list the current nodes in a set, and list the sets to which a node belongs.

For example, data center administration may apply various conceptual structures to the arrangement of the node computers, such as one that corresponds with the physical layout, in which node computers are identified by their physical position in the data center (e.g., cage, rack and slot location). This view of the data center allows the administration to find the physical location of a node, if, for example, it needs to be replaced. Alternatively, a physical layout set allows the administration to specify the installation location of a newly purchased computer (node).

There are other ways of organizing nodes in a data center, including a logical structure that organizes the nodes by the customer that is using each node. This enables the administrator to map between a customer and the node or nodes currently being used by that customer, such as to track and monitor usage of a particular customer, or to apply a change to all that customer's nodes. Another logical way of viewing the data center is to organize the nodes by function, where function is the application running on the nodes. For example, particular nodes may be grouped together because they are web servers, media servers or databases. Viewing the data center by function enables the administration to perform certain actions (such as to apply a patch for a particular application) only on the nodes that require it. Note that these are only examples, as there are various other ways that data center administration may want to organize the nodes in their data center, e.g., by network topology (nodes attached to particular switches or load balancers), by VLANs, by customer service level, by machine capabilities, and/or by installed OS and service patch level. Note that any given node may be grouped in any number of sets, as set forth in the example table below:

| Node | Member of these groups |
|---|---|
| Node 1 | LB Web, Customer A |
| Node 2 | LB Web, Customer A |
| Node 3 | Database, Customer A |
| Node 4 | Web |
| Node 5 | Web, Customer B |
| Node 6 | None |

In keeping with this aspect of the present invention, the ability to group nodes into sets (e.g., distinguished by simple names) simplifies the performance of various operations. For example, a set may identify node computers in use by a customer when that customer reports an issue, so that the status of those node computers can be quickly assessed and the issue resolved. Monitoring information collected from the nodes may be aggregated for a particular customer, such as into a form viewable via a Web site such that the customer can access to see the status of their machines. Nodes may be monitored for resource exhaustion (e.g. running out of disk space), to generate an alert for the customer using that machine. The alert can be reported to the customer (for example, by email), and/or used by the sales staff to contact the customer and recommend that they upgrade their configuration, e.g., to better hardware or an additional server.

In accordance with another aspect of the present invention, to manage the data center, operations are performed against one or more nodes in the data center by initiating an operation on the controller service 208, such as via an initiating process 304. Note that in FIG. 3, the initiating process 304 is represented as part of the administration program 210, however as is understood, these may be separate from one another, and indeed, the initiating process may be a script or other executable code. Further, note that for simplicity, FIG. 3 shows only one node 204, however as is understood, the controller 202 can control multiple nodes, e.g., at once or in some series.

As generally represented in FIG. 3, on the controller computer 202, a controller program 306 of the controller service 204 is invention is accessed and run through a schema interface 310. This schema (generally represented via FIGS. 4A-4I) provides representations of the available nodes in the data center, the sets, the available operations, and the results of running each operation. In general, on the controller computer 202, the controller service 208 can be considered as comprising the schema interface 310, the controller program 306 and the data store 302. Any process, script or user-interface that wants to access the controller service 208 does so through the schema interface 310. The controller program 306 determines the actions to take, which might involve accessing the data store 302, and/or communicating with one or more nodes (such as the node 204) via the transport layer 212. For example, the results data and other information needed to provide the administrator with the representations is generally maintained in the data store 302, which an administrator can access via the schema interface 310. In a typical implementation, the schema interface might be derived from the Common Information Model (CIM) standard for representing computing process and devices, such as described in U.S. patent application Ser. No. 09/020,146, assigned to the assignee of the present invention.

In general, to perform an operation, one or more nodes, or sets of nodes, on which the operation is to be performed is first selected, such as via the administration program 210. A selection may specify a single computer, all the computers in a set, all the computers in several sets, or a mixture of individual computers and computers in sets. The selection may have any duplicates removed therefrom, e.g., if the same node is specified via two or more selected sets. Note that selections are different from sets in that a set is an administrator-chosen representation of an organization of the data center, whereas a selection is generally a collection of computers temporarily specified for performing at least one operation thereto. In other words, while set members (and sets themselves) may change over time, they are a persistent representation of the organization of the computer nodes, whereas selections are transient sets of computer nodes, representing the intended target of specific operations. A selection is created when there is a need to perform an operation or series of operations against a given assembled number of computers. Once the operation or series of operations is complete, the representation of the selection may be deleted without losing information about the organization of computers in the data center. Selections may be considered to be "temporary" sets. In some implementations, selections may be limited to the degenerate cases where a selection may only contain either a single set or a single node.

The specific operations that the administrator can perform (e.g., via the administration program 210) include creating a selection, deleting a selection, and listing the computers in a selection. In one implementation, selections are stored on the controller 202, and each selection is identified by a unique serial number allocated when the selection is created. Selections may support operations in data centers containing thousands of computers, and each selection can contain any number of computers, from one to the total number of members in the data center. A record is maintained to track which operations are run on which devices, thereby providing an audit of what was run. This audit is normally archived and cleared on a regular basis.

Note that in a data center environment, the controller 202 is the control point of (at least part of) the data center, and is the repository of information about the data center. As a result, in such an environment, the controller needs to be highly available and recoverable in case of disaster. For availability, the controller may comprise a shared-disk cluster environment of multiple clustered machines, in which some clustered computers may fail without affecting operation of the controller 202. For disaster recovery, the state of the controller may be backed up, including details of groups, scripts, script code, and results of previously completed and in-process jobs. A backup process may be documented and encapsulated into a script which the administrator or other service can use to regularly perform the backup. Following a backup, the controller state may need to be restored onto a new controller, and additionally, the new controller needs to be able to take control of the nodes previously controlled by the previous controller. At the same time, security may be provided such that a rogue controller cannot to take control of nodes.

The scripts that can be executed on the nodes may be stored (e.g., in a script database in the data store 302 or elsewhere) on the controller 202. The scripts can be written to use any script host that is available on the target nodes. The script database comprises information about the scripts available to be executed on remote nodes, and the scripts themselves may be stored on the file-system of the controller, and the database contains the paths to the scripts. In one implementation, scripts may be located anywhere on the file-system of the controller. The administration program 210 or the like enables the creation or editing of a script on the file-system, creation of a script entry in the script database, editing of a script entry, deletion of a script entry, creation of a job (described below) that may use a script, deletion of a job, editing of a job, execution of a job, a retrieval of the status and results of a job.

In accordance with one aspect of the present invention, to perform an operation or series of operations on one or more selected nodes, once selection is accomplished, the controller service 208 creates a message (or messages) containing a job to be performed. The message is preferably formatted using XML, and is sent to each selected target node (e.g., the node 204 in FIG. 3) using a messaging protocol and transport layer protocol 212 on the controller and a corresponding protocol $214_1$-$214_n$ on each of the node or nodes specified in the selection. For simplicity, the controller program 306 can be considered as communicating directly with an agent service 218 including an agent program 312 on the node computer 204, using a defined XML messaging protocol 314 (FIG. 3), while the transport layer 212 on the controller 202 can be regarded as communicating directly with the transport layer 214 on the node 204 using a transport protocol 316 (FIG. 3). The transport layer 212 may comprise any system that can reliably send the message from the controller to multiple nodes $204_1$-$204_n$, and that a node 204 can use to send a message to the controller 202. For example, multicast may be used to send a message from the controller to multiple nodes. Where multicast is not available, or when the target is a single node, unicast may be used. An alternative transport layer would be to use the standard HTTP protocol to contain the message, and use unicast.

In one implementation, communication between the controller 202 and node 204 uses a Multiple Device Management (MDM) protocol to send scripts to the agent service 218, return results of running scripts, tell the agent service 218 to run binary executable code, perform other operations on the node 204 via the agent service 218, and send alert and event information from the agent service 218 to the controller 202. In this implementation, the MDM protocol operates on top of a transport layer protocol which provides reliably network communication between the controller and one or more agents, such as by using sender-side guaranteed multicast (SGM). Note that while the invention will be primarily described by logical communication via the messaging protocol and/or transport protocol, it is understood that an underlying physical network 216 (whether wired or wireless) connects the controller 202 and the nodes $204_1$-$204_n$.

By way of example of one common type of operation, the administrator via the controller computer 202 may execute a set of commands (e.g., a script) on one or more selected nodes. This is generally accomplished by selection of the nodes, and sending messages to the selected nodes. In addition to scripts, the messaging protocol 314 is extensible to allow for alternative types of operations, such as the execution of pre-compiled programs, or certain other operations.

In accordance with other aspects of the present invention, the node 204 includes the agent service 218, comprising the agent program 312. In general, agent service 218 is responsible for performing actions at the request of the controller 202, and for sending alerts and events to the controller 202. To this end, the agent program 312 receives communications (messages) from the controller 202, determines how to perform a required action or actions specified in the message (if any), and as needed, passes the action along with any arguments (parameters) to an appropriate execution engine 320. By way of example, if the controller 202 sends the agent program 318 a script, the execution engine 320 would typically be a corresponding script interpreter. The agent program also allows for some other operations which are part of the protocol between the controller and the computers, such as execution of binary executable code on the node 204. Note that instead of sending the binary executable code, the controller 202 preferably sends a network address for that code for the node 204 to either run it from that location, or download and run it. A node operating system 220 is shown for completeness, as well as a controller operating system 222.

In addition to execution of scripts or programs, other operations such as reboot, shutdown or suspend (move to a low power state) may be requested of a controlled node. Because if such operations were performed immediately (such as via script), the node 204 could not provide a result to the controller. Instead, such operations are performed by a special function-handling component 322 that first communicates a result to the controller 202, essentially stating that the command message has been received and understood. After sending the result, the node takes the appropriate action to satisfy the request.

To summarize, the MDM protocol enables the controller 202 to request that one or more nodes execute a particular operation, such as running a script on the agent, using a standard scripting host, or running binary code on the agent. The protocol does not have an understanding of the operations being performed, thereby keeping the protocol simple, and avoiding special case operations. However some operations have implications on the operation of the protocol itself, and are thus expressed in the protocol. Such special operations may include rebooting, suspending or shutting down the node computer. Also, the MDM protocol allows for management information to be exchanged, such as when a controller first communicates with a node so as to control it.

The MDM protocol is also used to send the results of running a script or binary, or special operation, back to the controller 202. Node alerts and events may be sent via the MDM protocol, as well as heartbeats, to periodically inform the controller that the node is properly operating. The interval information is configurable, and the controller 202 can send the interval information to the nodes via the MDM protocol.

Upon receiving the result of an operation, the controller 202 maintains a record of the operation. To this end, as the results come in from the nodes $204_1$-$204_n$, the results are extracted from the returned messages, and stored into the database 302. This provides an ongoing and complete record of each operation, for each node. The administrator or a process (such as a script) can interrogate this information on the controller 202 to determine the success of the operation on each node, and if necessary investigate or resolve failures. The message format also provides a way for the controller to maintain information about the state of each node, comprising the status of any alerts on the nodes.

As can be appreciated, the various agent service operations, including the running of scripts and performing of other actions, gives an administrator significant flexibility to perform arbitrary operations on the servers in a data center. For example, with many typical management operations, ready-built and tested scripts can be provided with the controller or node computer, which may be a preconfigured server. Such scripts give the data center administrator the ability to manage the servers in the data center for common operations, and may be provided with the controller 202, ready to use. Additional scripts may come with particular appliance servers or the like, (including new types of appliances, such as cache appliances). In such a case, the administrator need only load the scripts onto the controller 202, and configure the controller program 306 to know about these new scripts. Further, the node computers may be shipped with relevant scripts thereon, e.g., based on their function, and then automatically provide those scripts to the controller 202. For special situations, custom scripts can be written, tested and then added to the controller 202 by configuring the controller to know about the new script.

As described above, each node computer includes the agent service 218. As with any given controller, agent installation may come with the node, e.g., the computer ships as an appliance, whereby no installation is required.

Alternatively, the agent service may comprise separate software that needs to be installed, such as via a supplied installation script that performs installation on each computer to be managed.

To simplify the burden of running a data center, when a computer containing the agent service 218 is booted, the agent service 318 may automatically broadcast its existence on the network via a discovery component 330, such as via an auto-discovery protocol such as that provided by Universal Plug-n-Play (uPnP, a standard for auto-discovering computing devices on a network). On nodes having multiple network interface cards (NICs), the NICs used to broadcast can be restricted, e.g., if more than one NIC is used, only the first one which contains a responsive controller will be used for future operations, until the next reboot.

The controller 202 notices the broadcast via a discovery listening process 332, and if this computer does not already exist in the controller's representation of computers of which it knows, the broadcasting computer is added, and the controller will refer to this computer as a node. To this end, when the controller 202 notices an auto-discovery broadcast, the controller determines whether it already knows about this node. If so, the node has been previously booted within the data center, and is either in the list of uncontrolled or controlled nodes. If it is a controlled node, the controller 202 reestablishes control of the node. In either case, it marks the node record to show that the node is booted on the network. If the node is not known by the controller, the controller 202 will respond and add the information about the node to its internal database 302. The information obtained by the controller 202 will comprise the unique identifier of the node (such as a globally unique hardware identifier such as the BIOS GUID or MAC address of the network interface cards). When a node is newly discovered, it is first considered an uncontrolled node, and the administrator can make the determination whether to make this node be one that is controlled by the controller 202.

In addition to simplifying control, auto-discovery further provides for the use of automatic configuration of new machines. For example, an administrator may specify that a given set of commands is to be performed against all new machines, e.g., to inventory the new system, or apply currently required hotfixes, or to configure it for a given customer). The administrator may then write a script to consume an event raised when the new computer is added on the controller, and take appropriate action. Once discovered, the administrator can list all the new nodes in the data center, and either add them to sets as required, or perform operations against them. As can be readily appreciated, using an auto-discovery mechanism for finding new computers in the data center saves the administration from having to manually enter information (e.g., name, serial and IP information) for every new computer, and thus avoids potential data entry errors. In this manner, the administrator has an online reference list of available computer nodes, which aids in keeping inventory information about the data center contents.

To provide security, the present invention guards against controller software and agent software not authorized by the data center administrators, (respectively a "rogue controller" and "rogue agent"). Controllers and agents under control of the data center administrators are called "trusted controllers" and "trusted agents" respectively. To this end, the nodes which broadcast auto-discovery information onto the network, where several controllers may exist, are configured to only accept a response from the first controller to respond. Once the node receives a response, using public key, private key technology, the node thereafter will only accept control information from that controller and other trusted controllers. Normally this would be only the controller that first controlled the node, however it is anticipated that controllers will fail and need to be replaced, however such replacement controllers will be trusted via the private key. Note that the first controller to respond may be a rogue controller, in which case the node would be lost from control of the data center, however this may be avoided by deploying appropriate certificate data onto the agent before it is booted for the first time. If a new node is lost to a rogue controller, it can cause loss of resources for the data center administrator, however the rogue controller does not have access to any customer information on the node.

Once trust is established between the controller and the node, that node becomes controlled and a rogue controller cannot take over control of the node, although trusted controllers may take over control of the node (for example, to replace the original controller). Since rogue computers can also sniff the network, sensitive information is not passed over the network unencrypted, and the encryption is such that only the target nodes of a secured message can decrypt it. When an operation is invoked, it may specify whether the communication needs to be encrypted. This might be at the request of the initiating process, or because the script is marked as requiring encryption in the script database.

The data store 302 maintained by the controller 202 is arranged as a defined schema. In general, the controller maintains details of the nodes in the data center, set information, available operations, operations currently in progress and results of completed operations. Although not necessary, for convenience this database schema is arranged similar to the object model schema through which the administration program 304 interfaces (via schema interface 310) with the controller program 306 and the data store 302. Note that in one implementation, the object model schema represents the information in the form of defined objects, while in general, the database schema maintains records or the like that are used to construct the objects when queried. The schema is generally represented in FIGS. 4A-4I, and further described in APPENDIX A. However, the described schema is only one example, and the present invention is not directed to any particular way in which the data is maintained or presented.

The controller 202 thus maintains a certain amount of information about each node in the database. For example, each node is represented by a device data structure, comprising communication-related data (e.g., TCP-IP hostname), a unique identifier, and other miscellaneous data. Most of this information is a cached representation of the state of the node, such as the node's name. The cached information may include the items set forth in the following table, which also includes details about how that information is updated on the controller if it changes on the node:

| Information | Master location | How the controller is notified of the change |
|---|---|---|
| Machine name (TCP/IP hostname, excluding domain) | Node's operating system | Machine name change only becomes effective on reboot. Since reboot re-initiates discovery process, the new name is send to the controller. |
| Domain | Node's | Domain change only |

-continued

| Information | Master location | How the controller is notified of the change |
|---|---|---|
| | operating system | becomes effective on reboot. Since reboot re-initiates discovery process, the new name is send to the controller. |
| GUID | Node's hardware (BIOS) | Never changes |
| Serial number | Node's firmware (BIOS) | Should never change |

Other items of information about a node that are maintained on the controller include:

| Information | Description |
|---|---|
| Controlled? | Flag to say whether this node is controlled by this controller |
| Heartbeat timestamp | Date and time of last successful heartbeat with the node |

Nodes are identified on the controller by various information, such as the node name, (a short-form of the node's name, e.g., "server07"), and the MAC addresses of the NIC cards on the node. The node name may be used as the unique identifier for the node record on the controller. Both of these pieces of information are sent from the node to the controller using auto-discovery each time the node boots. If auto-discovery is not available on the network, then the administrator needs to manually add the node record containing at least the node name.

The node name may also be used by the controller 202 for communicating with the node. In one implementation, the controller resolves the name to an IP address using DNS, which means that the administrator needs to ensure that the controller has access to a DNS server that maps the node name to the (or an) IP address on the administrative NIC. The DNS server may be based on static data or use dynamic DNS to keep current with server names and IP addresses. Note that if the administrative network does not currently have a DNS server, then the controller itself may be used as a DNS server. Similar processes to dynamic DNS, such as one that watches for IP changes on the node and sends the updates to the controller may be used. Once a node becomes controlled, the controller establishes a permanent connection to the node.

Auto-discovery is based on the network between the node and the controller supporting the forwarding of multicast discovery packets, e.g., the packets are sent by the node to a pre-defined (fixed) multicast IP address and port. Since not every data center environment supports multicast forwarding, (e.g., either because of router limitations, or policy), the data center can operate in other modes, such as to use a controller per multicast domain (typically, one controller per subnet), or operate without auto-discovery. In this case, some operations that would otherwise be automatic are performed manually.

When a managed node reboots, the controller looses any permanent connection to the node. In one current implementation, the controller 202 does not attempt to automatically reestablish communication, but rather waits for an auto-discovery packet from the node. When the controller 202 receives this packet, it knows the node is available and re-establishes connection with the node. In the event auto-discovery is not available on the work, the administrator manually re-establishes communication between the controller and the rebooted node, such as via an appropriate method, e.g., a Controller.RecoverManagedNode method. Note that in general, methods do not return a value, so if desired, a caller needs to use a language-specific method to determine whether a method (or other operation) failed, as described in APPENDIX A.

The object model, which implements the schema, comprises three main features, namely sets, devices and jobs. Sets represent groups of devices. Each set has a unique name, and may contain none, one or more devices. A given device may be in multiple sets. Sets are represented on the controller only; in one present implementation, the devices have no knowledge of what sets they are in, and are not informed when they are added or removed from sets. Sets are implemented in the object "Sets". Note that in one present implementation, only devices can be members of a set, however in other implementations, sets can be members of other sets.

Devices are the individual servers in the data center that may be managed by the controller. In one present implementation, the only devices that can be managed are computers that have the agent software installed on them. Devices are identified by their name, and the controller resolves this name to an IP address using the DNS in order to communicate with the device.

Device information is stored in several objects. A Devices object stores the basic information, including the name, while the MAC addresses are stored in DeviceHWAddrs objects, which are linked to the Devices object. Other hardware information (such as SMBIOS GUID and disk drive signatures) may be stored in instances of this object. To distinguish among the different types of information, the DeviceTypes object holds definitions of the different types of hardware addresses. Each instance of DeviceHWAddrs is linked to the corresponding instance of DeviceTypes. The IP address associated with a particular MAC addresses may also be stored, in instances of DeviceHWIPAddrs which are associated with the DeviceHWAddrs instance representing the particular MAC address. At present, IP address information is not stored for MAC addresses.

Jobs generally refer to two types of jobs information, namely job templates, which are jobs ready to be run, and job histories, which are previously run jobs. Job templates are stored in the JobInstances object. Instances of this JobInstances object are identified by a combination of two properties, a job name and a job identifier. Job templates are stored with a job identifier of zero and a name that is unique among the JobInvocations with a job identifier of zero. The properties of a job template (apart from the job identifier) may be edited by the user. In a present implementation, no other objects are used to store job templates.

Job histories are stored in several objects. A JobInvocations object stores the basic information, including the name, job identifier and time that the job was run. The job identifier is a value other than zero. The name may be blank, and may be the same as other JobInvocation instances (since the job identifier uniquely identifies a job history). Each JobInvocation that represents a job history is linked to an instance of the Jobs object. This represents the status of the job, irrespective of the number of devices it was run on. It can be regarded as the "parent" for the status of the jobs on each of the individual devices. The actual status for the job on each device is stored in additional instances of the Jobs class, one per device. Each of these instances is linked to the parent Jobs instance, and can be regarded as the "children" of the parent instance. This forms a two-level parent-child relationship, which may be extended to additional levels. Note that if the job is not run on any devices (because the set it is being run on is empty), then the parent Jobs instance will not be linked at any children Jobs instances).

The Jobs instances that correspond to the status of a job on an individual device do not store the actual output of the job. Instead, the output is stored in one or more instances of the JobLogs object. Each instance of JobLogs stores part of the output of the job. The full output can be reconstructed by using the sequence property of this object to put the partial outputs into order. JobLogs store three types of output, including the standard error output, the standard output, and the exit status when the job actually exits. The JobLogs instances are created as the output from the job comes into the controller. Note that it is possible for there to be no JobLogs associated with a given (child) Jobs record because either the job did not start on the device (in which case the Jobs record contains an error indication), or no output or exit status has yet been received from the device.

As can be understood from FIGS. 4A-4I, APPENDIX A and the above description, the architecture, structures and protocols of the present invention enable considerable flexibility and efficiency in managing a data center. A first example can be seen when installing an upgrade or patch on a number of computers. Instead of having an administrator go to each computer (possibly remotely) and run the upgrade package, with the architecture and structures of the present invention, the administrator may go to the controller (possibly remotely), select the target nodes from the sets and node lists maintained on the controller, and initiate the upgrade, possibly at a time in the future. After the upgrade has been initiated, the administrator can check the results on the controller and see which (if any) nodes failed to complete the update. This significantly reduces the effort required to perform the upgrades, and automatically maintains an auditable log of the results of performing the upgrades, and also reduces the potential of errors if (for instance) the upgrade requires specific processing on each computer which would previously have to be manually entered onto each computer. Further, using aspects of the present invention, the operation can be stored in the controller and tested on a test system before the identical operation is performed on the production systems.

A second example of this flexibility and efficiency can be seen when adding a new server for a new hosting customer. Instead of installing the operating system manually, then configuring the computer for the customer, with the various aspects of the present invention, the administrator can maintain a number of available 'spare' computers, which are powered on, but not in live use. When a new customer signs up, a set of operations can be initiated (either automatically or manually) to select one of the spare computers, then configure it for the particular customer. This configuration may also include configuring any additional devices (such as switches or load-balancers) required to service this customer. Because the configuration steps are performed by scripts, rather than manually, the risks of errors are significantly reduced. Additionally, it can be performed automatically, enabling the data center administrator to configure the system to (for example), automatically configure the system for the customer after the customer completes a purchase request on the data center's Web site.

A third example can be seen in monitoring and collecting data about the status of a group of computers. Instead of having to collect data from a number of computers by manually setting up a collection system, an operation can be run on each of a number of computers. The operation can regularly report usage information back to the controller, which then stores that information into storage such as the data store or other suitable memory. The information can at a later point be analyzed by the administrator, to understand how the computers are operating, to investigate the reasons for failures in service, or for another suitable purpose.

Figure 7:
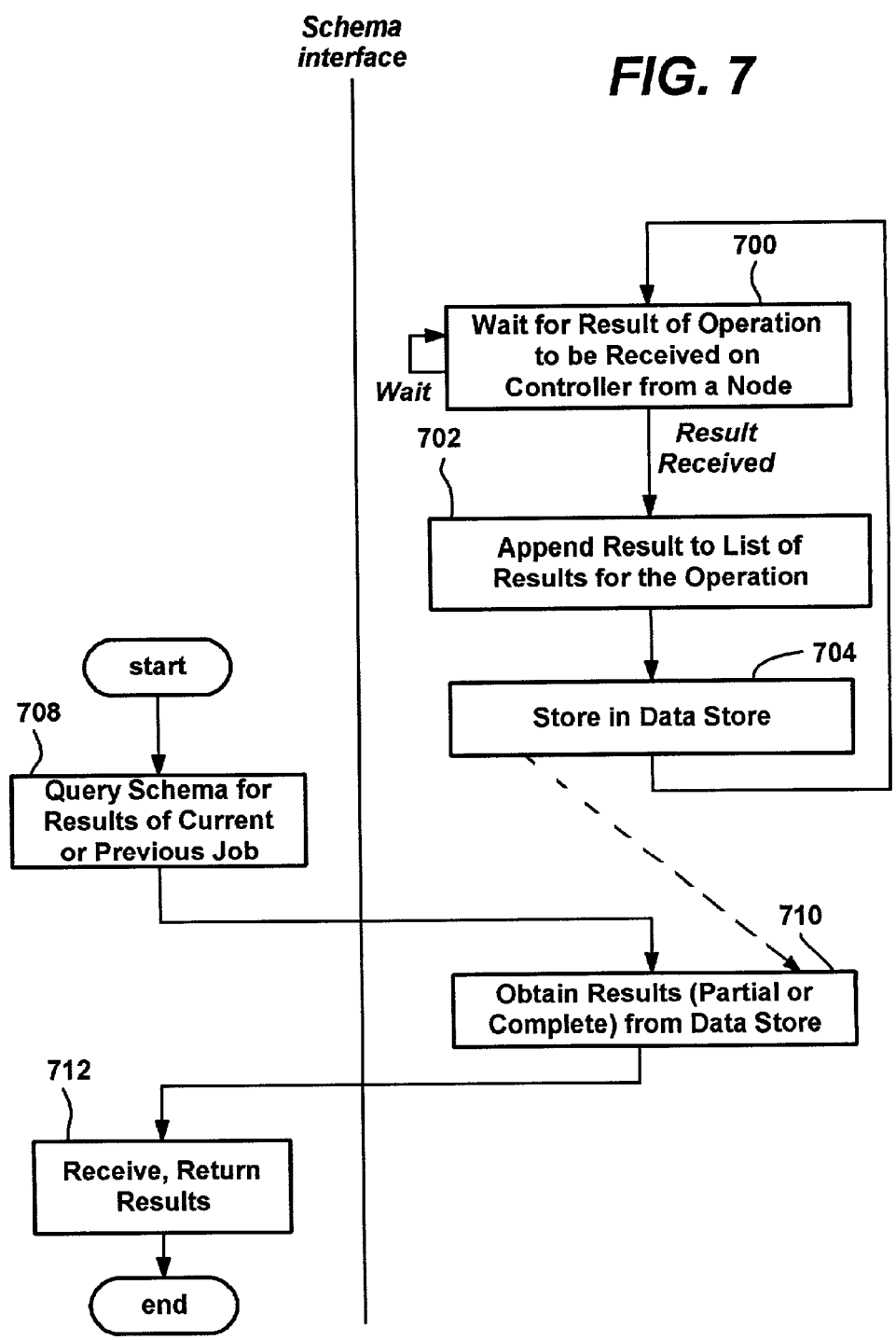
FIG. 7 is a flow diagram generally representing results of an operation being obtained, and a user interface, script or process that initiated an operation on the controller determining the results of an operation in accordance with an aspect of the present invention.

Turning to an explanation of the operation of the present invention with particular reference to FIGS. 5-7, to perform an operation on a number of nodes, the target nodes are first selected and a job comprising the operations to perform created therefor, as represented by step 500. Selection may comprise selecting an individual node, multiple individual nodes, a set, multiple sets, or any combination. The operation to be performed may be a script, binary program, or other type of task. Note that the initiator process 304, (which may be a user through an application, Web UI or command line, or an automated policy in script or rule) makes the selection and selects the operation. A job 404 is created in the data store for this operation on the selection.

At the time the job is to be run, it is initiated, with any arguments provided, as represented by step 504. When initiated, at step 506 the controller 202 creates a message comprising information about the task (e.g., in the case of a script, the script itself and any parameters). This message is then associated on the controller 202 with the target nodes.

The message and the representation of the target nodes is used by the controller to initiate the operation, which is accomplished, in one implementation, by creating an appropriate XML message at step 508 and sending the message to the target nodes using a transport layer at step 510. At this point, the transport layer 212 on the controller 202 has been given the information about the target nodes, and the message to send to those nodes. Note that control has been returned to the initiating process 304 (user interface, script or process that initiated the operation on the controller 202), which does not have to wait for the operation to complete on all nodes. This allows the initiating process 304 to initiate multiple operations as desired and later collect the results of those operations.

The message is passed to the transport layer, which is responsible for ensuring that the message gets to the correct nodes, e.g., across a TCP/IP network. When received at the target nodes, the job is started, as represented by step 512.

FIG. 6 generally represents the job being run on a node, such as the node 204, beginning at step 600 wherein the message is received. In FIG. 6, the left side of the vertical bar shows the actions performed by the agent program or service on the node, while the right side shows the action performed by the node's operating system. On the node, the agent's transport layer receives the message, and passes the message up to the agent service 218 for interpretation. In general, the agent service 218 determines how to perform the action, executes it, and results are returned back to the controller via the transport layer.

More particularly, step 602 represents extracting the operation from the message, and step 604 represents determining the execution engine to use. For example, different types of script require different execution engines, and binary code may need to be downloaded before execution. In any event, step 606 represents sending the operation and any arguments passed in the message to the execution engine that was determined, while step 608 represents the operating system executing the operation.

Step 610 represents the output of the operation being collected and/or otherwise stored, which may be anything from a simple success or failure to a collection of operation-requested data. Step 612 creates a message (e.g., in the MDM protocol in the XML format), and step 614 returns the message to the controller 202 via the transport layer. In this manner any results of the operation (such as the output from a script or program) are formatted into a message and returned to the controller using the transport layer.

FIG. 7 represents a way in which the initiating process 304 that initiated the operation on the controller 202 can determine the results of the operation on each node. In general, via step 700-704, the controller maintains a record of the operation, e.g., as the results come in from the nodes at step 700, the results are extracted from the returned messages on a per operation basis at step 702, and stored into the data store 302 (or other suitable storage) on the controller 202 at step 704. This activity provides an on-going and complete record of the operation, for each node.

As represented via steps 708-712, the administrator or a process (such as a script), which is not necessarily the initiating process 304, can interrogate this information from the controller 202 to determine the success of the operation on each node, query for other data, and if necessary investigate or resolve failures.

As can be seen from the foregoing detailed description, there is provided a multiple device management method and system that facilitates management of computing devices, such as in a datacenter. The method and system are highly flexible and efficient, and significantly reduce the costs associated with managing multiple computing devices.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a data center computer network, a method for controlling a plurality of computer systems from a controller, the method comprising:
   an act of maintaining a plurality of unique sets at a controller, each unique set differentiated by operational capability, customer association or application running, and comprising a grouping of at least one computing device configured to process jobs;
   an act of determining that a computing device of at least one of the unique sets has finished a portion of the jobs assigned to the computing device;
   an act of providing at the controller a new job corresponding to at least one operation to perform on a computing device of the plurality of unique sets;
   an act of receiving a command to redeploy the computing device that finished a portion of the assigned jobs, the redeploying comprising assigning the computing device to a new unique set;
   an act of sending a message from the controller to each computing device in the new unique set, including the redeployed computing device, the message instructing each computing device that receives the message to execute the new job; and
   at the controller, an act of storing results of the new job from each computing device in the new unique set;
   wherein providing at the controller the job comprises providing data corresponding to a script to run on the unique set.

2. The method of claim 1 wherein providing at the controller the unique set comprises providing data corresponding to at least one set of computing devices.

3. The method of claim 1 wherein providing at the controller the job comprises providing data corresponding to a binary program to run on the unique set.

4. The method of claim 3 wherein the data corresponding to a binary program to run on the unique set comprises a network address.

5. The method of claim 1 further comprising, receiving the message at an agent on a computing device identified in the unique set, and executing the job in response to the message.

6. The method of claim 5 wherein executing the job in response to the message comprises running a script.

7. The method of claim 5 wherein executing the job in response to the message comprises running a binary program.

8. The method of claim 7 wherein running a binary program comprises retrieving the program based on a network address in the message.

9. The method of claim 1 further comprising, receiving at the controller discovery information indicating that a node computing device is operational so as to be controlled by the controller.

10. The method of claim 9 further comprising, recognizing that the node computing device is already controlled by the controller.

11. The method of claim 9 further comprising, recognizing that the node computing device is not controlled by the controller, and controlling the node computing device.

12. The method of claim 11 further comprising, adding information identifying the node computing device to a data store maintained by the controller.

13. The method of claim 9 further comprising, automatically configuring the node computing device based on receiving the discovery information.

14. The method of claim 1 wherein storing results of the job comprises collecting the results in a storage.

15. The method of claim 1 wherein storing results of the job comprises persisting the results.

16. In a data center computer network, a system for controlling a plurality of computer systems from a controller, the system comprising:
   a controller, the controller configured to maintain a plurality of unique sets, each set comprising a grouping of at least one computing device configured to process jobs, each unique set differentiated by operational capability, customer association or application running;
   a computing device identified in the unique set, the computing device including agent software connected for communication with controller software on the controller;
   a job maintained by the controller, the job corresponding to at least one operation to perform on the computing device identified in the unique set, wherein the computing device is configured to process a new job after processing the job;
   a transport configured to communicate a message containing data corresponding to the job from the controller software to the agent software of the computing device after determining that a computing device has finished a portion of the jobs assigned to the computing device, the message instructing the agent software to make the computing device that finished a portion of the assigned jobs part of a new unique set and execute a new job, the agent software of the computing device executing the new job and returning results to the controller in response to receiving the message; and a data store at the controller, the controller storing the results from the agent software in the data store;

an execution engine at the computing device, the agent software communicating with the execution engine to perform the at least on operation corresponding to the job;

wherein the execution engine comprises a script engine, and wherein the agent software communicates with the execution engine to run a script.

17. The system of claim 16 further comprising a schema interface configured to provide access to information in the data store.

18. The system of claim 16 wherein the execution engine software for executing a binary program, and wherein the agent software communicates with the execution engine to run the binary program.

19. The system of claim 16 further comprising software on the computing device that performs a set of at least one special operation requested by the controller.

20. The system of claim 19 wherein the set of at least one special operation comprises a reboot operation.

21. The system of claim 19 wherein the set of at least one special operation comprises a suspend operation.

22. The system of claim 19 wherein the set of at least one special operation comprises a shutdown operation.

23. The system of claim 16 further comprising a discovery listening process at the controller that detects discovery information provided by computing devices on the network.

24. The system of claim 23 wherein each computing device includes a discovery component for automatically providing the discovery information.

25. The system of claim 24 wherein each computing device automatically provides the discovery information following a reboot of that computing device.

26. The system of claim 23 wherein the controller includes software for automatically configuring a computing device that provides the discovery information.

27. In a data center computer network, a method for controlling a plurality of computer systems from a controller, the method comprising:

an act of maintaining a plurality of unique sets at a controller, each unique set identifiable by network address and differentiated by operational capability, customer association or application running, and comprising a grouping of at least one computing device configured to process a binary program;

an act of determining that a computing device of at least one of the unique sets has finished processing a portion of the binary program assigned to the computing device;

an act of providing at the controller a new binary program including at least one script to process on a computing device of the plurality of unique sets;

an act of an agent receiving a command to redeploy the computing device that finished a portion of the assigned binary program;

an act of redeploying the computing device that finished a portion of the assigned binary program in response to the command, the redeploying comprising assigning the computing device to a new unique set;

an act of sending a message from the controller to each computing device in the new unique set, including the redeployed computing device, the message instructing each computing device that receives the message to execute the new binary program; and at the controller, an act of storing results of the new binary program from each computing device in the new unique set wherein providing at the controller the job comprises providing data corresponding to a script to run on the unique set.

* * * * *